Patented Feb. 9, 1954

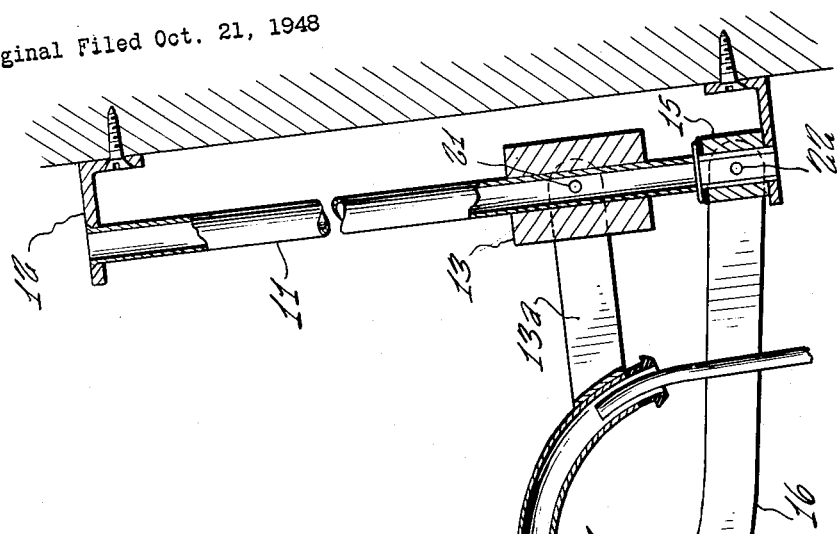
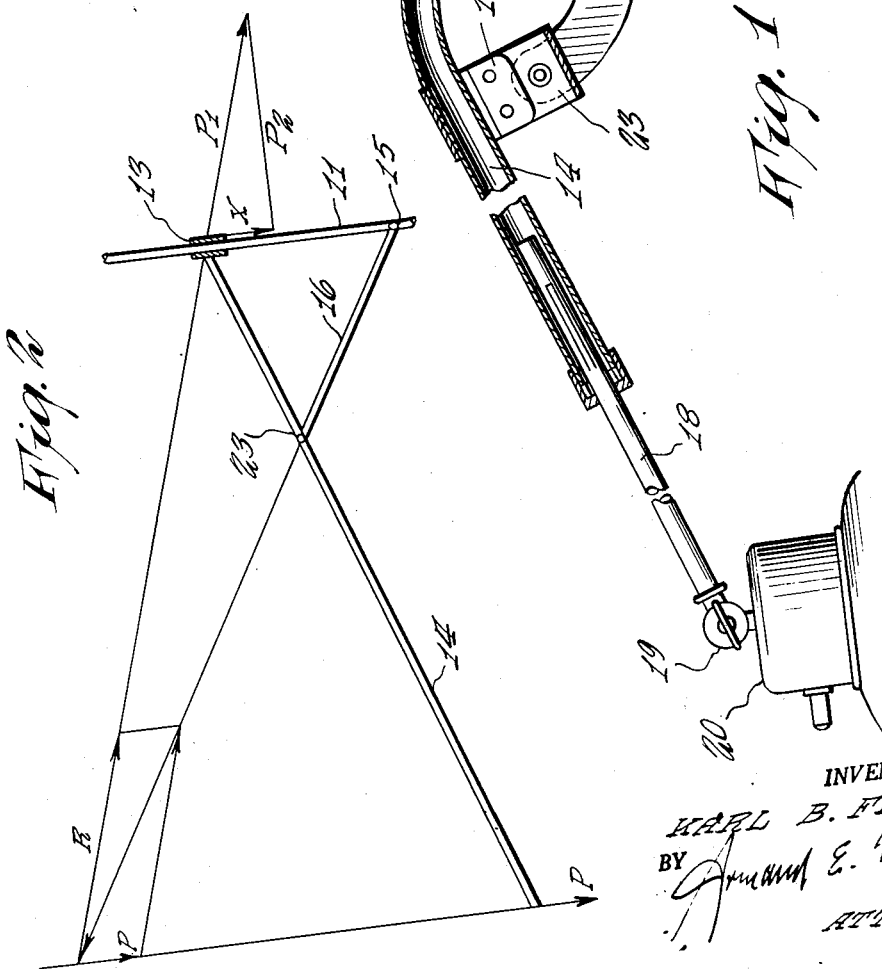

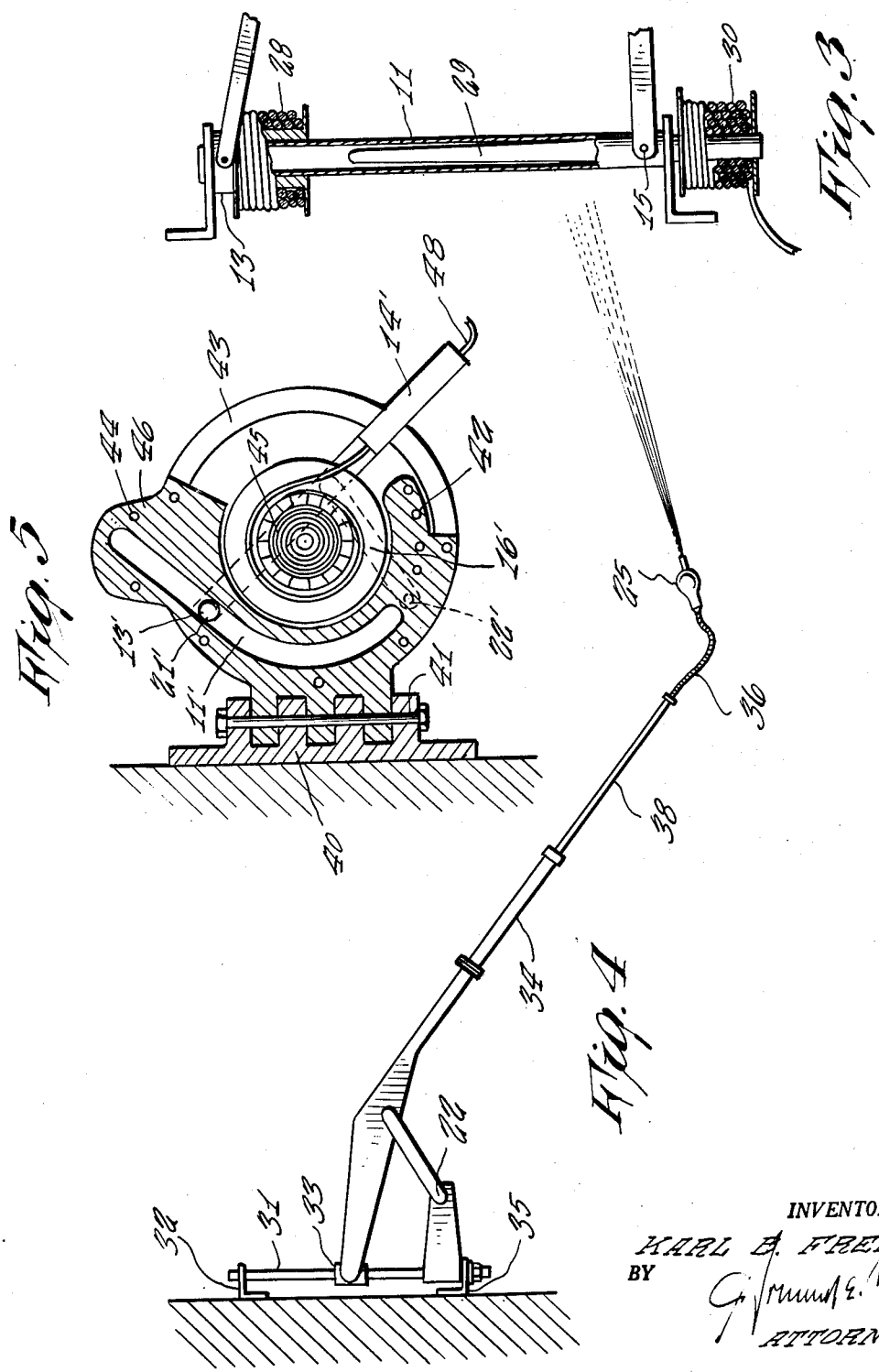

2,668,683

UNITED STATES PATENT OFFICE 2,668,683

ADJUSTABLE SUPPORTING DEVICE

Karl B. Freed, Stockholm, Sweden

Original application October 21, 1948, Serial No. 55,795. Divided and this application April 17, 1951, Serial No. 221,473

6 Claims. (Cl. 248—280)

This invention relates to an adjustable supporting device, such as is used for suspending fixtures and tools of various types.

This application is a division of my copending application 55,795, filed October 21, 1948, now abandoned.

It is an object of the invention to provide improved means for raising, lowering, and rotating the supporting device by simple manipulations.

Another object of the invention is to provide a supporting device having an arm which can be retained in any position without special fastening means.

These and other objects are accomplished by the invention which will be understood from the following description and the accompanying drawings, in which Fig. 1 illustrates, partly in section, a complete supporting device provided with a telescopic arm for the support of an electric lamp.

Fig. 2 is a diagrammatic illustration of the forces involved in the operation of the supporting device.

Fig. 3 illustrates a starting mechanism for moving the main arm of the supporting device.

Figs. 4 and 5 show two other embodiments of the supporting device according to the invention.

In Fig. 1, 11 indicates a guide post, for instance a tube, attached to a wall or similar supporting means, by two brackets 12. On tube 11, a hollow cylindrical guide member 13 is slidingly arranged, to which the inner end of a main bearing arm 14 is connected by means of a link 13a journaled to guide member 13 at 21. At the lower end of guide post 11, a mounting 15 is arranged for the attachment of a supporting arm 16, pivoted to mounting 15 at 22; with the other end, arm 16 is journaled at 23 to an adjustable interconnecting element 17 mounted on the main bearing arm 14, on which it is held by friction in any desired position. The outer end of arm 14 is shown to support a telescoping tube 18. The latter carries at its outer end fastening means 19 for an electric lighting fixture 20. Guide member 13 and mounting 15 can be rotatable on tube 11.

The above mentioned construction permits of raising, lowering and rotating the arm 14 and the fixtures suspended thereon by means of a simple manipulation; it will only be necessary to change the position of guide body 13 or of the interconnecting element 17 to a different position for raising or lowering the arm and its load, which are always balanced so that they will be retained in any desired position without further means of fixation.

It is not always necessary to have an extension 18 on arm 14 since the carrying arm may also be made in a single piece of definite length.

Furthermore, the interconnecting element 17 need not be slidable on arm 14 and held thereon by friction, but can be secured thereto, e. g. by welding.

Moreover, it should be understood that guide member 13 can be a counterweight, but this is not the only embodiment considered. If desired, member 13 can be a very light-weight element, provided that the device as a whole is balanced in such a way that the adjustment can be made by the simple manipulation described.

Fig. 2 is a diagrammatic view of the forces working on the bearing arm 14. The resultant of the weight of the bearing arm and the fixture is called P, and may be transferred in its own direction to the point of intersection of a line passing through the supporting arm 16, and is divided into a component in the direction of the supporting arm 16, and one in the direction through the sliding body 13, giving as a result $P_1$. This force, in its turn is divisible into a component perpendicular to the sliding tube 11, and a component in the direction of the sliding tube 11, namely: the components $P_2$ and X. If the fastening point 23 of the supporting arm on the bearing arm is properly chosen, the component X can be small enough to avoid using any special friction-increasing devices in order to retain the bearing arm in any desired position.

Fig. 3 presents a modified embodiment of the invention for the starting of the arm from a distance. The construction comprises an electromagnet 28 attached to the body 13, and a magnet core 29 inserted within tube 11. The device operates in the following manner:

When current is passed through the electromagnet 28, the arm 14 takes up a certain position corresponding to the induced current. The reversing of a circuit-breaker moves the arm in the opposite direction. In order to intensify the magnet action, or to make the raising or lowering of the arm possible, the magnet core 29 is provided with an electromagnet 30, preferably attached to the lower part of the magnet core.

When only the magnet 28 is used, the arm 14 can be brought back by means of a spring, or the like.

The described device is useful for all purposes, where it is desired to move an object to a certain position. It can also be used for suspending and moving tools, e. g. drilling tools, drawing devices, and the like, and for many other purposes.

Fig. 4 illustrates another embodiment of the adjustable supporting device, which is, in this case, to be used for the support of a dentist's lamp.

Similar to Fig. 1, the device comprises a guide post 31, mounted in brackets 32, 35, and supporting, slidingly arranged, a member 33 made integral with main bearing arm 34. Extending therefrom a rod 38 is provided, to which a flexible metal tube 36 is attached. This tube, in turn, carries an electric bulb or the like, 25. By means of the flexible tube, the lamp can be adjusted to any desired position.

In the modified embodiment according to Fig. 5, instead of a sliding tube 11 as illustrated in Fig. 1, a slide track 11' is provided, which has a curved bottom portion. This track 11' is cut into a cast body 46. A plug 13', corresponding to the slidingly arranged guide member 13, is provided between the shanks of the formed upper part of an arm 14'. The points designated by 21', 22' and 23' correspond to 21, 22, 23 in Fig. 1. The supporting device according to this embodiment is attached to a wall by means of a supporting bracket 40, forming at the same time one of the elements of a hinge joint assembled by means of a bolt 41. The points 22' and 23' are connected through the supporting arm 16'. The position of the point 22' can be varied by shifting from one hole to another one in a series of holes 42 in the lower part of the body 46. Although only one supporting arm 16' is illustrated in Fig. 5, it is preferable to use two arms 16' for supporting arm 14', one on each side of the body 46. 48 indicates a cable for e. g. an electric fixture, and 45 a reel for the winding and unwinding of same when the bearing arm 14' is moved up or down. The winding preferably takes place by means of a coil spring. The cast body 46 is surrounded on both sides by a cover 43, of which only the rear part is shown in Fig. 5. The two covers are joined by means of screws, or the like, passing through holes 44.

While I have described and shown in the drawings a number of embodiments of the invention by way of example, it should be understood that these were given by way of illustration and not of limitation and that many modifications in the details can be made without departing from the spirit of my invention.

I claim:

1. An adjustable supporting device comprising a main arm, a guide member attached to a fixed surface, a sleeve-shaped body slidably arranged on said guide member and rotatable thereon, a supporting arm for said main arm, an interconnecting element between said two arms, said supporting arm being with one end pivotally mounted at one end of said guide member, and journaled with its other end to said interconnecting element, said element being frictionally held on said main arm, an extension slidingly arranged in said main arm capable of supporting a load, said supporting arm and said sleeve-shaped body being capable of movement to a position whereby the weight of the main arm including its load is counterbalanced so that the main arm will be retained in any desired position without further means of fixation.

2. An adjustable supporting device according to claim 1, wherein the guide member for said sleeve-shaped body is a straight vertical post.

3. An adjustable supporting device according to claim 1, including an electromagnetic starting device for said main arm, which comprises an electromagnet attached to said sleeve-shaped body, a magnet core within said guide member, a second electromagnet disposed at the lower end of said magnet core and means for energizing said core.

4. An adjustable supporting device comprising a main arm, a guide member attached to a fixed surface, a sleeve-shaped body slidably arranged on said guide member and rotatable thereon, a supporting arm for said main arm, an interconnecting element between said two arms, said supporting arm being with one end pivotally mounted at one end of said guide member, and journaled with its other end to said interconnecting element, said element being secured to said main arm, said arm being capable of supporting a load, said supporting arm and said sleeve-shaped body being capable of movement to a position whereby the weight of the main arm including its load is balanced so that the main arm will be retained in any desired position without further means of fixation.

5. An adjustable supporting device comprising a main arm, a guide member attached to a fixed surface, a body slidably arranged in said guide member and rotatable therein, a supporting arm for said main arm, said supporting arm being with one end pivotally mounted at one end of said guide member, and journaled with its other end to said main arm, said arm being capable of supporting a load, said supporting arm and said body in said guide member being capable of movement to a position whereby the weight of the main arm including its load is balanced so that the main arm will be retained in any desired position without further means of fixation.

6. An adjustable supporting device according to claim 5, wherein a curved track is provided as a guide means for said body.

KARL B. FREÉD.

References Cited in the file of this patent

UNITED STATES PATENTS

| Number | Name | Date |
| --- | --- | --- |
| 820,781 | Hammond | May 15, 1906 |
| 1,088,669 | Allen | Feb. 24, 1914 |
| 1,111,177 | Pieper | Sept. 22, 1914 |